United States Patent
Alth

[11] 3,735,162
[45] May 22, 1973

[54] SINGLE-COIL LINEAR MOTORS

[76] Inventor: Max Alth, 6 Tamarack Road, Port Chester, N.Y.

[22] Filed: Feb. 25, 1972

[21] Appl. No.: 229,267

[52] U.S. Cl..................................310/13, 310/27
[51] Int. Cl..............................................H02k 41/02
[58] Field of Search......310/12–19, 27; 318/121, 135

[56] References Cited

UNITED STATES PATENTS

| | | | |
|---|---|---|---|
| 2,104,131 | 1/1938 | Matthews | 310/13 UX |
| 2,365,632 | 12/1944 | Fisher | 310/14 |

FOREIGN PATENTS OR APPLICATIONS

| | | | |
|---|---|---|---|
| 989,169 | 4/1965 | Great Britain | 310/27 |
| 453,256 | 9/1936 | Great Britain | 310/27 |

*Primary Examiner*—D. F. Duggan

[57] ABSTRACT

One element comprises a long bar of copper or aluminum transversely pierced at regular intervals by iron cores. The second element— either element may move— comprises a solenoid with an iron core terminating in two long arms, parallel to each other and spaced a little wider than the aforementioned conductive bar, which is positioned by idler wheels between and in line with the arms of the solenoid's core.

When the solenoid is energized by AC, a repulsion current is induced in the conductive bar and it moves away from the coil, guided by the idler wheels.

10 Claims, 4 Drawing Figures

Patented May 22, 1973 3,735,162

SINGLE-COIL LINEAR MOTORS

BACKGROUND TO PRESENT DISCLOSURE

The present disclosure is a continuation of work in electric motors that so far has resulted in U.S. Pat. No. 3 586 976, Mar. 2, 1971, Eddy Current Brake, and claims granted for Self-Start Single Phase Motor, Ser. No. 105 381. Patent number not assigned as yet.

Concurrent with this application a second application disclosing an improved version of the self-start, single phase motor is being submitted to the Commissioner of Patents.

Figure 4:
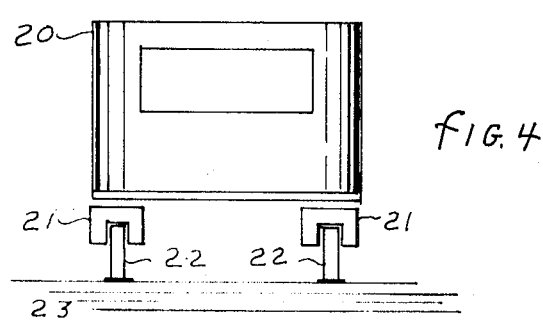

FIG. 4 schematically illustrates the present invention utilized for railed transport.

PRINCIPLE OF OPERATION

It is well known that a moving field produces a counteracting magnetic field around any conductor it traverses. What appears not to be known is that the field originates within the coil and the flux will follow the path of least magnetic resistance until its end. Further; it is well known that a moving field generates a current in what ever conductor it traverses and the magnetic field associated with the counter-current is repulsive in respect to the originating field. What is not as well known or known at all, is that generated counter-current persists well after the original field has reached its peak and begins to decay. Thus a conductive slab or plate placed within an AC field is repulsed by the field.

By utilizing a solenoid with an iron core terminating in long arms parallel to one another, and following a line pointing away from the coil, we have with the flow of AC current through the coil, a "guided flux field" that will repulse and move any conductive material placed within the air gap, i.e., the space between the poles.

ADVANTAGES OF PRESENT INVENTION

The present invention provides a very simple, low cost, single-phase linear motor.

Its simplicity and low cost make it suitable for any linerar power operation where AC is available.

Motor size can be directly scaled to any power need; small and large including vehicle transport.

Used to power a rail vehicle, its advantage lies in the simplicity of the rails. An aluminum strap pierced by soft iron cores serves as one rail.

Another advantage is that the major portion of the thrust vector is linear, with a smaller vector offset by some 90° from the thrust vector. Air gap is not critical.

The present linear motor has no shading coils, no split-phase winding, no phase-delay capacitor. It has but a single coil.

Multi-phase operation may be achived by utilizing more than one coil on the motor or by using several motors, each connected to a phase of the input power.

Figure 1:
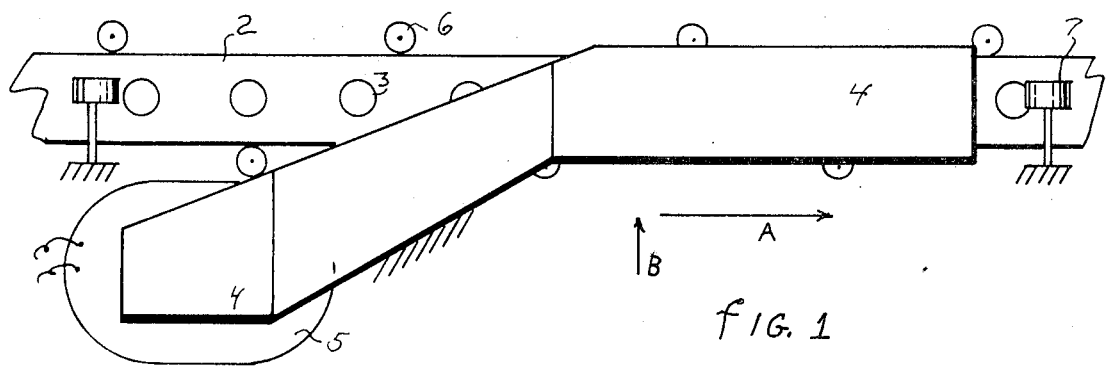
FIG. 1 is a side view of the motor.

FIG. 1 illustrates the basic form of the invention. 2, in this design, is the moving segment or armature of the motor. It may be copper or aluminum. 3 is an iron core piercing the moving segment or armature. 5 is the solenoid coil and 4 are the solenoid arms or poles. 6 and 7 are idler wheels.

Figure 2:
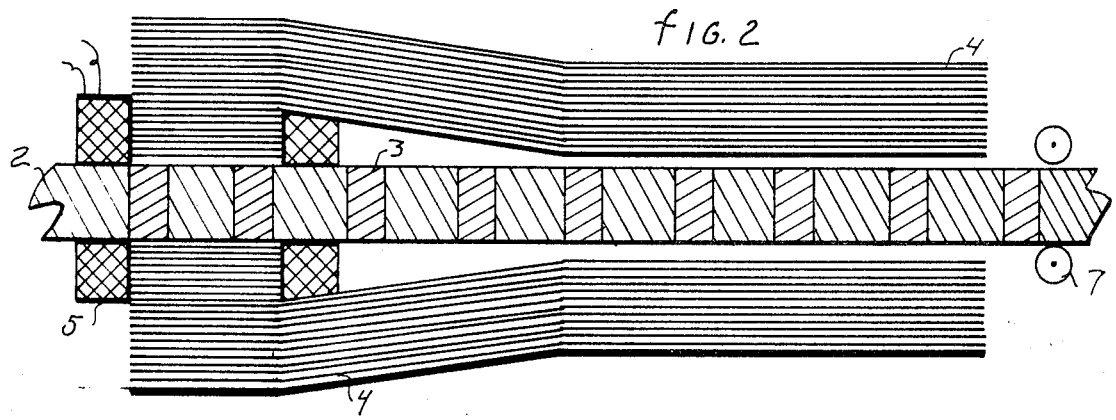
FIG. 2 is a plan view of the same motor.

FIG. 2 is a plan view of the same motor; the same digits are used to designate the parts. 5 is the coil, 4 is the core terminating in the off-set pole arms, 2 is the conductive armature, 3 the transverse iron cores. 7 is an idler wheel, the others are not shown. B and A illustrate the effective force vecters.

Figure 3:
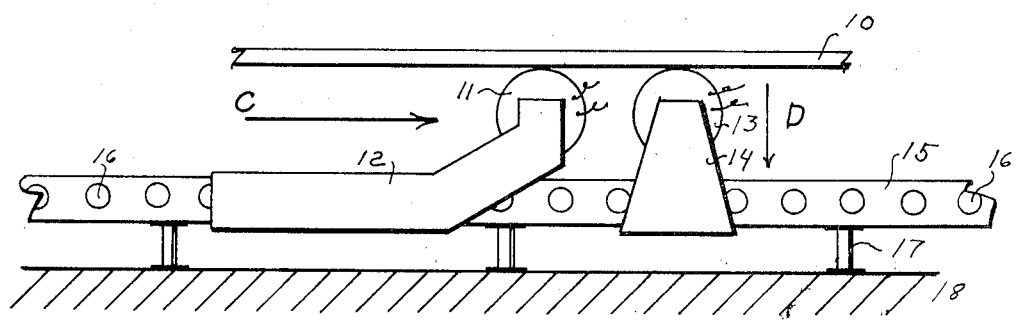
FIG. 3 illustrates two versions of the same motor used for vehicle transport.

FIG. 3 shows the motor as it may be used for railed transport. 10 represents the rail car; 11 is one motor coil which energizes pole arm 12; 13 is the coil of the second motor, 14 its pole arms; 15 is the conductive armature supported above ground by stantions 17, while 16 is a traverse iron core. C and D illustrate the effective force vectors.

The use of two linear motors as shown in FIG. 3 permits the vehicle to be raised above the rails to any predetermined distance, to some extent irrespective of load, then forward motion is secured by energizing the second motor, coil and pole 11 and 12 respectively.

FIG. 4 illustrates how two rails and associate linerar motors might be used to support a car. 20 is the car, 21 is one motor, 22 is the rail and 23 represents the road bed.

It should be noted that pole arms, 4 in FIG. 1 and 2; 12 in FIG. 3, are considerably longer than the cross section of their respective solenoid cores, and that the air gap between the armature and pole arms is relatively small.

Solenoid cores and pole arms are shown as of laminated magnetically permeable material; this is most efficient, but cost iron can also be used. The armature need not be pieced by iron cores, but may be solid copper or aluminum.

Having described my invention and its manner of manufacture, this is what I claim as new and novel and desire to secure by Letters Patent:

1. A single-phase linear motor comprising an electrically conductive means generally bar shaped, a solenoid having a magnetically permeable core terminating in two long, parallel arms spaced a little wider than said conductive means, said arms off-set in relation to said solenoid; said conductive means positioned by low friction means permitting said conductive means to move freely in a line with said parallel arms; when said solenoid is energized with AC current, each half cycle produces a magnetic flux originating at the coil and travelling outwards to the ends of said pole arms, inducing a counter current in sad conductive means and thus driving said conductive means in a direction away from said solenoid.

2. A device as claimed in claim 1 wherein said electrically conductive means comprises a solid bar of conductive metal generally rectangular in cross section.

3. A device as claimed in claim 1 wherein said electrically conductive means is transversely pierced by a plurality of magnetically permeable cores.

4. A device as claimed in claim 1, wherein said permeable magnetic core and associate arms comprise a solid bar of cast iron.

5. A device as claimed in claim 1, wherein said magnetically permeable core and associate arms comprise laminated magnetically permeable material.

6. A device as claimed in claim 1, wherein said parallel arms may be of a length other than long.

7. A device as claimed in claim 1, wherein said parallel arms may be straight and without offset.

8. A device as claimed in claim 1, wherein two and more single-phase linear motors may be grouped to produce lift and drive as desired.

9. A device as claimed in claim 1, wherein said conductive means is fixed and said solenoid is free to move.

10. A device as claimed in claim 1, wherein said solenoid is fixed and said conductive means is free to move.

* * * * *